United States Patent
Xiao et al.

(10) Patent No.: US 10,013,449 B1
(45) Date of Patent: Jul. 3, 2018

(54) VALIDATING AND NON-VALIDATING SECONDARY INDEXES FOR A TABLE IN A NON-RELATIONAL DATA STORE

(71) Applicant: Amazon Technologies, Inc., Seattle, WA (US)

(72) Inventors: Wei Xiao, Bellevue, WA (US); Kiran Kumar Muniswamy Reddy, Sammamish, WA (US); Pejus Manoj Das, Shoreline, WA (US); Adam Douglas Morley, Seattle, WA (US); Shirley Xue Yi Ly, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 14/859,062

(22) Filed: Sep. 18, 2015

(51) Int. Cl.
    *G06F 17/30* (2006.01)
(52) U.S. Cl.
    CPC .. *G06F 17/30371* (2013.01); *G06F 17/30312* (2013.01); *G06F 17/30321* (2013.01)
(58) Field of Classification Search
    CPC ............. G06F 11/0793; G06F 11/1435; G06F 9/3836; G06F 3/0483; G06F 3/0484
    USPC .................................. 707/687, 690
    See application file for complete search history.

(56) References Cited

U.S. PATENT DOCUMENTS

| | | | |
|---|---|---|---|
| 5,548,770 A | 8/1996 | Bridges | |
| 6,112,209 A | 8/2000 | Gusack | |
| 6,870,812 B1 | 3/2005 | Kloth et al. | |
| 7,373,241 B2 | 5/2008 | Bauerle et al. | |
| 8,504,691 B1 | 8/2013 | Tobler et al. | |
| 8,601,000 B1 | 12/2013 | Stefani et al. | |
| 8,837,285 B2 | 9/2014 | Sammour et al. | |
| 9,116,862 B1 | 8/2015 | Rath et al. | |
| 9,239,874 B1 | 1/2016 | Madany et al. | |
| 9,385,956 B2 | 7/2016 | Xiao et al. | |
| 9,430,156 B1 | 8/2016 | Shilane et al. | |
| 9,471,500 B2 | 10/2016 | Kruus et al. | |
| 2005/0160108 A1 | 7/2005 | Charlet et al. | |
| 2006/0080345 A1 | 7/2006 | Murthy et al. | |
| 2007/0112795 A1 | 5/2007 | Travison, Jr. et al. | |
| 2007/0239769 A1* | 10/2007 | Fazal ................ | G06F 17/30554 |

(Continued)

OTHER PUBLICATIONS

U.S. Appl. No. 14/859,069, filed Sep. 18, 2015, Kiran Kumar Muniswamy Reddy et al.

(Continued)

*Primary Examiner* — Hung T Vy
(74) *Attorney, Agent, or Firm* — Robert C. Kowert; Meyertons, Hood, Kivlin, Kowert & Goetzel, P.C.

(57) ABSTRACT

A non-relational data store may implement validating and non-validating secondary indexes for a table. Operations at a table for a given item may be performed when indexing the item to create a secondary index or when updates to the given item are received. Attribute values of a given item may be validated with respect to an indexing schema for the secondary index. For a non-validating secondary index, validation errors detected for the attribute values may be ignored so that the operation at the table may be performed. For a validating secondary index, validation errors detected for the attribute values may result in denying performance of the operation. In some embodiments, a secondary index from may be changed from validating to non-validating, or non-validating to validating.

20 Claims, 7 Drawing Sheets

(56) References Cited

U.S. PATENT DOCUMENTS

| | | | |
|---|---|---|---|
| 2010/0138456 A1 | 6/2010 | Aghili | |
| 2011/0035205 A1 | 2/2011 | Brideson et al. | |
| 2011/0264668 A1 | 10/2011 | Hacker et al. | |
| 2012/0330954 A1 | 12/2012 | Sivasubramanian et al. | |
| 2013/0110845 A1 | 5/2013 | Dua | |
| 2013/0332610 A1 | 12/2013 | Beveridge | |
| 2014/0046917 A1 | 2/2014 | Smith | |
| 2014/0112147 A1 | 4/2014 | Esposito | |
| 2014/0195720 A1 | 7/2014 | Akella et al. | |
| 2014/0196048 A1 | 7/2014 | Mathur et al. | |
| 2014/0279855 A1 | 9/2014 | Tan et al. | |

OTHER PUBLICATIONS

"Global Secondary Indexes—Amazon DynamoDB", Retrieved from URL: http://docs.aws.amazon.com/amazondynamodb/latest/developerguide/GSI.html on Jul. 2, 2016, pp. 1-9.

U.S. Appl. No. 14/859,072, filed Sep. 18, 2015, Kiran Kimar Muniswamy Reddy et al.

U.S. Appl. No. 14/859,059, filed Sep. 18, 2015, Kiran Kumar Muniswamy Reddy et al.

U.S. Appl. No. 14/859,075, filed Sep. 18, 2015, Aanchal Gupta et al.

U.S. Appl. No. 14/858,360, filed Sep. 18, 2015, Aanchal Gupta et al.

U.S. Appl. No. 14/859,055, filed Sep. 18, 2015, Kiran Kumar Muniswamy Reddy, et al.

Kim, Je-Min, and Jin-Soo Kim. "Androbench: Benchmarking the storage performance of android-based mobile devices." Frontiers in Computer Education. Springer Berlin Heidelberg, 2012. 667-674.

Narasayya, Vivek R., et al. "SQLVM: Performance Isolation in Multi-Tenant Relational Database-as-a-Service." CI DR. 2013, pp. 1-9.

Kavalanekar, Swaroop, et al. "Measuring database performance in on line services: a trace-based approach." Technology Conference on Performance Evaluation and Benchmarking. Springer Berlin Heidelberg, 2009, pp. 1-14.

Bose, Sharada, et al. "Benchmarking database performance in a virtual environment." Technology Conference on Performance Evaluation and Benchmarking. Springer Berlin Heidelberg, 2009, pp. 1-16.

Kallman, Robert, et al. "H-store: a high-performance, distributed main memory transaction processing system." Proceedings of the VLDB Endowment 1.2 (2008): 1496-1499.

Lee, Taerim, et al. "Implementation and performance of distributed text processing system using hadoop for e-discovery cloud service." Journal of Internet Services and Information Security (JISIS) 4.1 (2013): 12-24.

Chalkiadaki, Maria, and Kostas Magoutis. "Managing service performance in nosql distributed storage systems." Proceedings of the 7th workshop on middleware for next generation internet computing. ACM, 2012, pp. 1-6.

\* cited by examiner

VALIDATING AND NON-VALIDATING SECONDARY INDEXES FOR A TABLE IN A NON-RELATIONAL DATA STORE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index.

Figure 1:
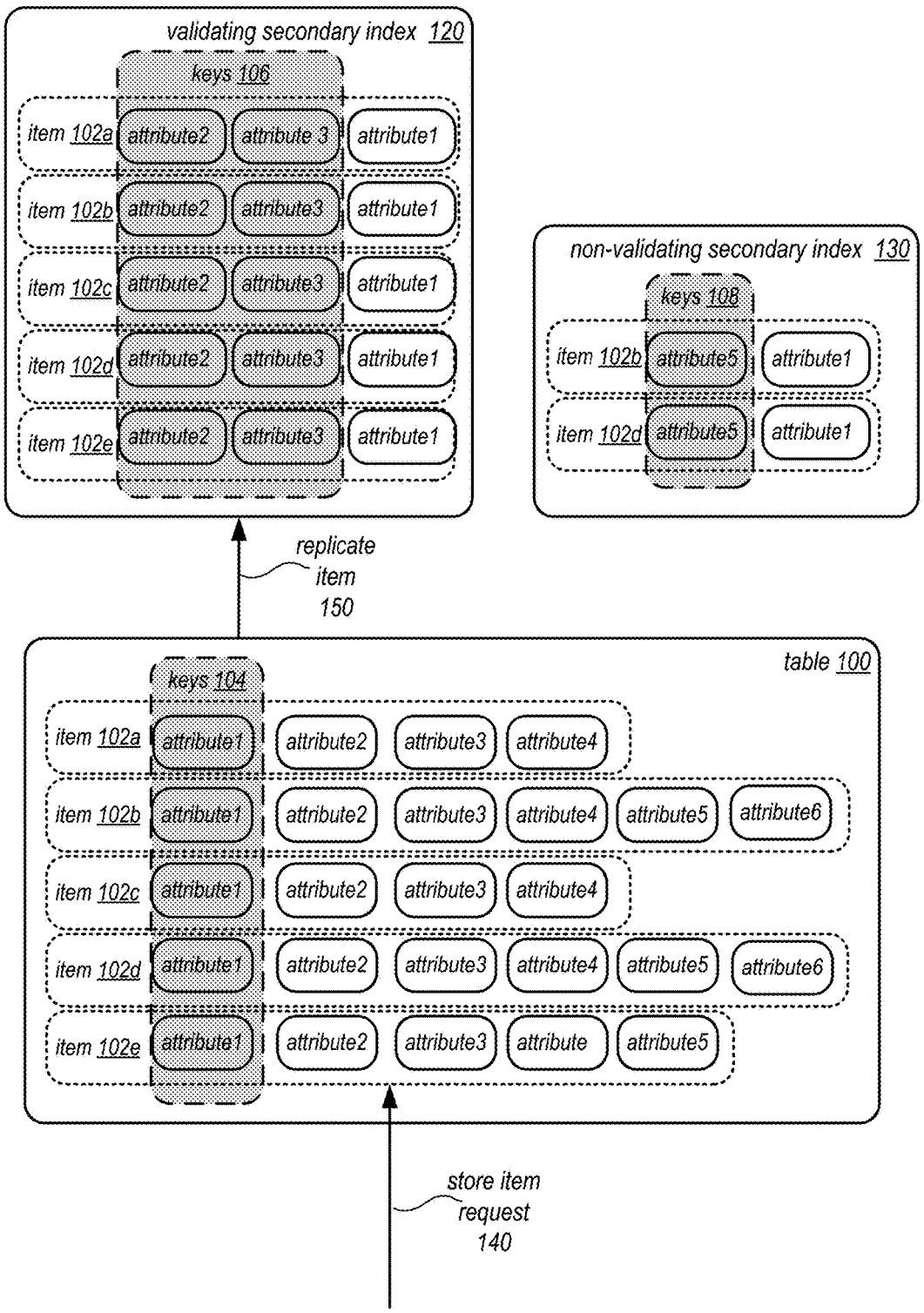
FIG. 1 is a logical block diagram illustrating validating and non-validating secondary indexes for a table in a non-relational data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement validating and non-validating secondary indexes for tables in a non-relational data store. Non-relational data stores offer accessible and scalable storage to one or more multiple different clients. Tables of items (which may include one or more data values or attributes) may be stored, managed and accessed according to a key value pair which uniquely identifies an item in the table. Generally, this allows for fast throughput to update data in items or store new items. However, in some scenarios, locating items that have particular attributes may be resource intensive. For instance, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above. Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternatives access capabilities to data, creating the secondary index can reduce the flexibility of the non-relational data store. Secondary indexes, for instance, may impose validation requirements on a table or other secondary indexes in some embodiments so that the secondary index is consistent with the table according to the indexing schema for the secondary index. Consider the example given above, where the gender attribute and age attributes are used to provide an index that is sorted according to gender and age range according to the indexing schema for the secondary index. The secondary index may impose a validation requirement that age attribute values be stored as number values rather than string values. However, at the table from which the secondary index is created or updated, items could have age attributes that are stored as strings or numbers (which would otherwise be allowed by the non-relational data store). Thus, when creating the secondary index or updating the secondary index those items that have age attributes as a strings are invalid according to the validation requirement and would not be included in the secondary index (as including invalid items would lead to a scenario where the secondary index would not include items that are eligible for inclusion the secondary index but for the validation requirement, such as items that include gender and age attributes that are not of the valid data type). Enforcing validation requirements for a secondary index imposes de-facto validation requirements on the table. Providing a non-validating secondary index, however, offers a less structured schema for providing alternative access capabilities and imposes less of a consistency burden upon a table or other secondary indexes as invalid items may be allowed in a table, even if not allowed in the non-validating secondary index.

FIG. 1 is a logical block diagram illustrating validating and non-validating secondary indexes for a table in a non-relational data store, according to some embodiments. As discussed above, a table, such as table 100 may have a number of items 102 that include different attributes. As attributes may unique to an item or unrelated to other items, the number of attributes in an item may differ. Moreover, as there is no imposed schema on attributes (excepting primary key attributes 104 which may uniquely identify an item 102), attributes with a same attribute name may have different configurations (e.g., different date types, such as number or string). Keys 104 (primary key values) may be attributes whose values are utilized to identify uniquely an item in the table.

A secondary index may be created when a table is created, or later after a table already exists. The creation of a secondary index when a table already exists may be performed while the table is still online, continuing to service access requests to items in the table. A configuration of the secondary index, whether validating or non-validating, may be specified at the time of table creation. Additionally, the configuration may be changed after the secondary index exists (altering the behavior of subsequent attempts to update the secondary index). For example, validating secondary index 120 may be changed to a validating secondary index or non-validating secondary index 130 may be changed to a validating index.

Secondary indexes are created according to a different indexing schema than the indexing schema of the table (although indexing schemas for different secondary indexes may be very similar). For instance, table 100 utilizes attribute 1 (which is common to all items 102) as the attribute for indexing table 100, whereas keys 106 are attributes 2 and 3 and used to index validating secondary index 120 and keys 108 are attributes 5 which are used index non-validating index 130. Note that not all items may include the same number of attributes, as a non-relational data store may allow for a table to store differing numbers of types of attributes. To be eligible to be included in a secondary index an item may have to have the same attributes as the key attributes identified for the secondary index by the indexing scheme for the secondary index (e.g., keys 106 or 108). For example, non-validating secondary index 130 uses attribute 5 for indexing, thus items 102b, 102d, and 102e are the only items in table 100 eligible for inclusion in non-validating secondary index 130. In validating secondary index 120, attributes 2 and 3 are used, so items 102a through 102e are eligible.

Eligible items may be added to a secondary index as a result of different operations performed at table 100. For example, a request 140 to store item 102e in table 100 may be received. In order to perform the operation to store item 102e in table 100, some or all of the attributes of item 102e may have to be validated (depending on whether the item is eligible for inclusion in a secondary index). As item 102e includes attributes 2 and 3, it is eligible for inclusion in validating secondary index 120. Thus, attributes 2 and 3 may be validated with respect to validation requirements for attributes 2 and 3 (such as data type or size requirements). Additionally, as item 102e includes attribute 5, it is eligible for inclusion in non-validating secondary index 130. Thus, attribute 5 may be validated with respect to validation requirements for attribute 5. Whether the operation to store item 102e is performed depends on whether or not the validation requirements are satisfied for a validating secondary index. If, for instance, either one of attributes 2 or 3 were invalid, then request 140 would be denied and item 102e would not be stored in table 100. If, as illustrated in FIG. 1, attributes 2 and 3 were valid, then item 102e would be replicated 150 to validating secondary index 120 (according to the indexing schema for validating secondary index which may only including storing attributes 2, 3, and 1 in index 120). In this way, the items stored in table 100 that are eligible for validating secondary index 120 are consistent.

A non-validating secondary index, such as non-validating secondary index 130, does not have to be consistent with the table is generated from. For instance, consider the request 140 to store item 102e. If attribute 5 is determined to be invalid (e.g., wrong data type) with respect to validation requirements for non-validating index 130, then the operation to store item 102e at table 100 may still be performed (ignoring the invalidity of item 102e with respect to table 100). Note that item 102e, as illustrated in FIG. 1, may not be replicated to non-validating secondary index 102e (as non-validating secondary indexes may still enforce validation requirements for items stored in index 130).

In various embodiments different kinds of validation requirements may be enforced. A validation requirement (which may also be referred to as a validation parameter) define that a particular attribute is to have a particular data type (e.g., string, number, binary). For example, an item may have an attribute (e.g., attribute 5 of item 102e) with a string value of "99" when the validation parameter for the attribute defines the attribute as a number. Then the attribute value of "99" is invalid with respect to the validation parameter—even though "99" represents a number, the data storing "99" is encoded as a string in storage for the table. Another example of a validation requirement may be validation parameter implemented with respect to the size of data stored in an attribute. If, the amount of data representing an attribute value exceeds the size parameter, then the attribute may be invalid.

Operations may be performed at a table for different reasons. As illustrated in FIG. 1, a request to store a new item, item 102e may be received. A request to update an existing item, such as item 102c, may also be received. Similar techniques to validate the update request (e.g., checking whether the update renders the attribute invalid for validating secondary index 120 or non-validating secondary index 130) may be performed. In at least some embodiments, validation of attributes for items may be performed as part of an operation to create a secondary index. Each item in table 100, for instance, may be indexed and if valid replicated to the secondary index being created.

Please note that previous descriptions are not intended to be limiting, but are merely provided as logical examples of validating and non-validating secondary indexes for a table. Different numbers of secondary indexes or different combinations of types of secondary indexes (e.g., all validating or all non-validating) may be implemented. Additionally, the number of attributes, items, and key attributes may be different.

This specification begins with a general description of storage service implementing a network-based data store that may provide validating and non-validating secondary indexes for a table. Then various examples of the storage service are discussed, including different components/modules, or arrangements of components/module, that may be employed as part of implementing the storage service. A number of different methods and techniques to implement validating and non-validating secondary indexes for a table in a non-relational data store are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
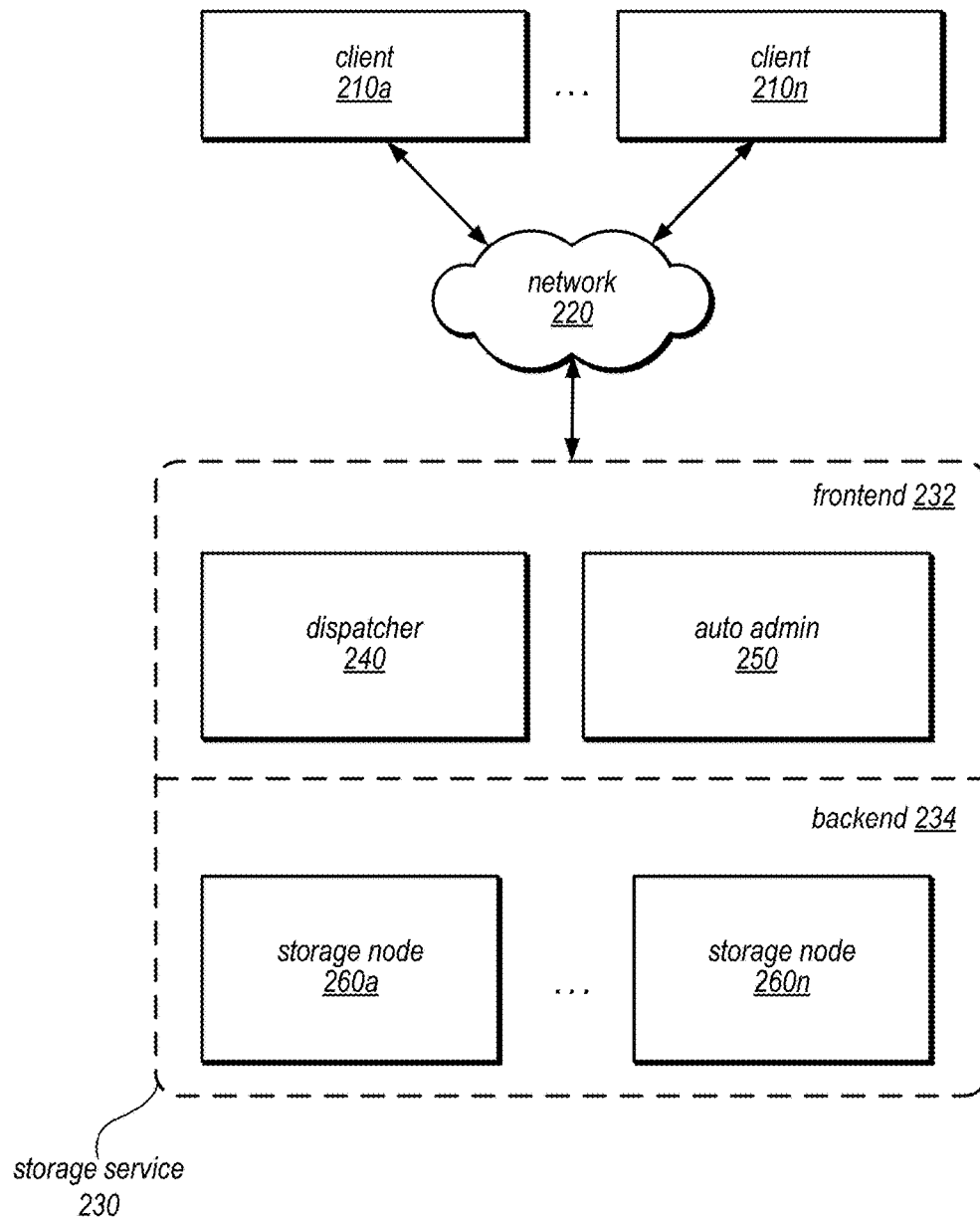
FIG. 2 is a block diagram illustrating a storage service that implements validating and non-validating secondary indexes for a table, according to some embodiments.

FIG. 2 is a block diagram illustrating a storage service that implements validating and non-validating secondary indexes for a table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 7 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 2, network-based storage service 230 may include a dispatcher 240 (which may be configured to receive, authenticate, parse, throttle and/or dispatch service requests, among other things), one or more administrative components, or auto admin instances, 250 (which may be configured to provide a variety of visibility and/or control functions, as described in more detail herein) which may be implemented as part of frontend 232. Storage service 230 may also implement a plurality of storage node instances (shown as 260a-260n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 230 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 260a-260n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
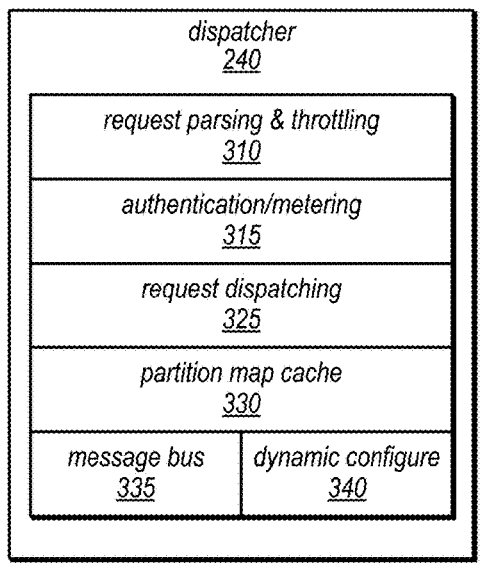
FIGS. 3A-3C are block diagrams illustrating various components of a storage service, according to some embodiments.
Figure 3B:
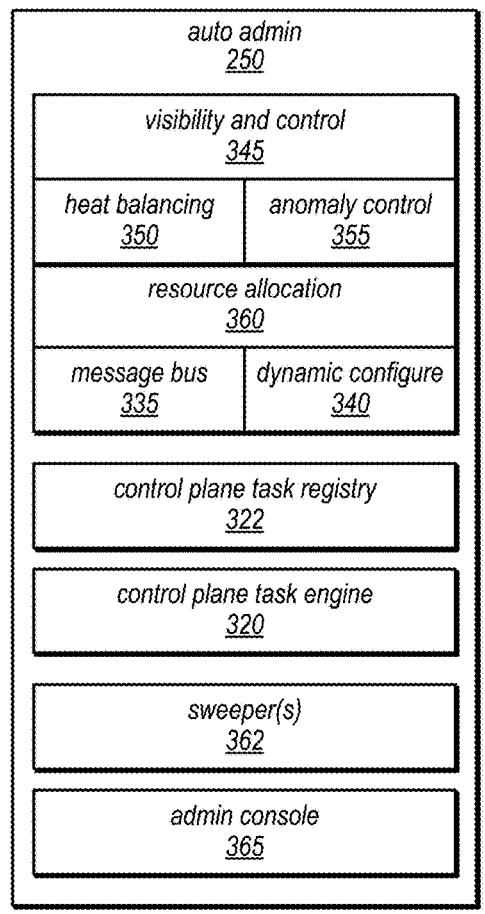
Figure 3C:
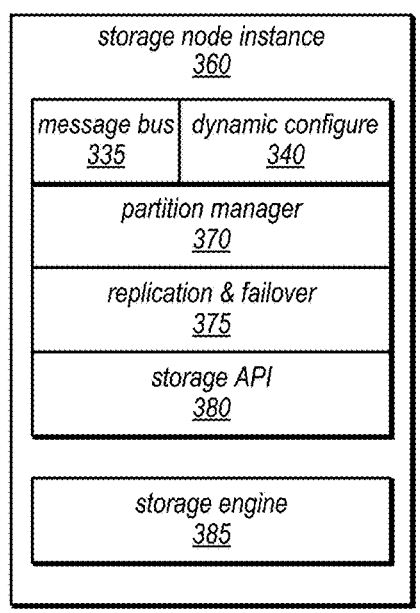

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In some embodiments, request dispatching may perform some or all of the techniques to perform or deny requests according to whether the request results in an item that is invalid with respect to a secondary index, as discussed below with regard to FIGS. 4-6 below. In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, or any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380). Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. Such size limits may be validation parameters, as discussed below, in some embodiments. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
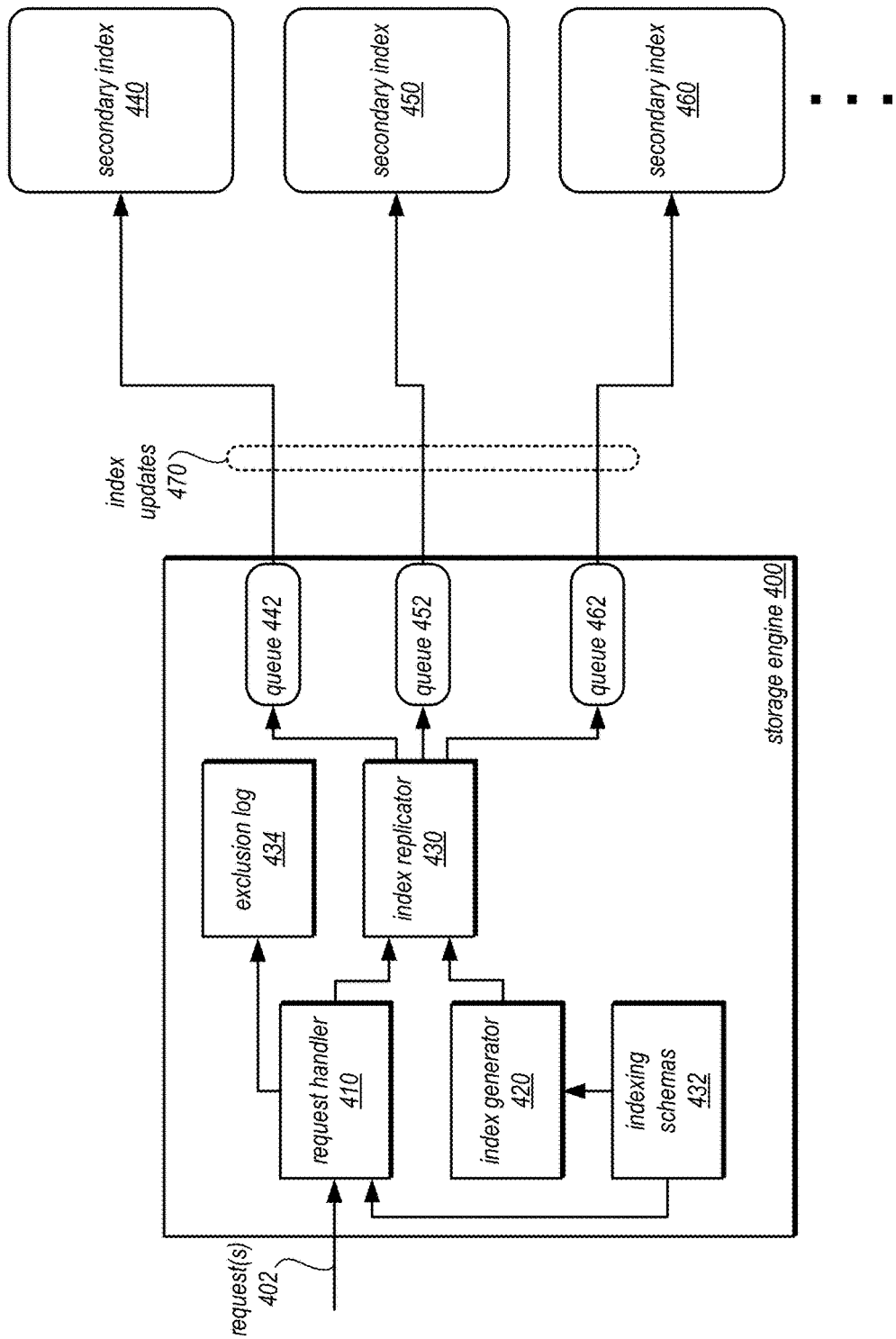
FIG. 4 is a logical block diagram illustrating an example storage engine that implements updates validating and non-validating secondary indexes for a table, according to some embodiments.

FIG. 4 is a logical block diagram illustrating an example storage engine that implements updates validating and non-validating secondary indexes for a table, according to some embodiments. Storage engine 400 may be a storage engine for a storage node (e.g., like storage engine 385 in FIG. 3). Storage engine 400 may implement various components to process requests, generate a secondary index, and replicate updates to secondary indexes for a table (or portion of table, such as a partition) hosted at the storage node implementing storage engine 400.

For example, in at least some embodiments, request(s) 402 (e.g., requests to perform operations to read, get, write, put, insert, add, remove, or delete) may be processed by request handler 410. In the case of those requests to update the table (e.g., modify items or add new items), request handler 410 may evaluate whether the request violates validation parameters for the table (e.g., updates that are invalid with respect to the primary key value(s) of the table) and a secondary index, such as secondary indexes 440, 450, and 460. Request handler 410 may implement the various techniques discussed below with regard to FIG. 6 utilizing indexing schemas 432 maintained for the secondary indexes in order to perform or deny operations in response to requests 402 (with respect to validating secondary indexes) and provide indications to index replicator 430 to identify updates for secondary indexes to be performed as a result of storing a new item or changing an attribute value of an item. Request handler 410 may also store in exclusion log 434 a record of those operations performed at a table which resulted in items or updates to a table that are not replicated to a non-validating secondary index (e.g., updates to a non-validating secondary index for eligible items that are stored in the table but are invalid with respect to validation parameters of the indexing schema 432 for the non-validating secondary index). In some embodiments, exclusion log 434 may be provided to a client, user, or owner of a table to identify inconsistencies between a table and a secondary index. For example, one or multiple notifications may be sent to a client identifying the excluded items or data in exclusion log 434.

In some embodiments, storage engine 420 may implement index generator 420. Index generator 420 may index individual items for inclusion in a new secondary index according to the indexing schema 432 for the new secondary index. Index generator 420 may incrementally index items in a table (or portion of a table, such as a partition). For those items to be included in the new secondary index, online index generator 420 may provide instructions to index replicator 430 to perform index updates to the appropriate secondary index. Index generator 420 may determine whether or not an item is included in the secondary index according to those techniques discussed below with regard to FIG. 6. For example, an eligible item (an item that has the correct attributes) may still be excluded from inclusion in a non-validating secondary index if the eligible item is invalid according to validation parameters for the new non-validating secondary index. If the secondary index being created is validating and invalid items are identified, then index generator 420 may abort the creation of the secondary index, remove the invalid item from the table, or reconfigure the secondary index as non-validating, in some embodiments. Although not illustrated, index generator 420 may also store records of items that are excluded from a secondary index when creating the secondary index.

Index replicator 430 may direct the replication of index updates 470 to different secondary indexes. For example, index replicator may manage outbound queues, 442, 452, and 462 which are specific to the secondary index receiving the update (e.g., secondary indexes 440, 450, and 460 respectively). Secondary index update(s) 470 may be removed from the queues and sent to secondary indexes to be performed according to controlled rates so as not to overwhelm the secondary indexes with updates.

Note that the above techniques describe attempting to perform operations at a table for items that may be eligible for inclusion at validating and non-validating indexes may be implemented at other components of storage service 230. For example, dispatcher 240 may implement similar techniques to accept or deny requests based on whether the request would result in an invalid item with respect to validation parameters for validating and non-validating secondary indexes.

Figure 5:
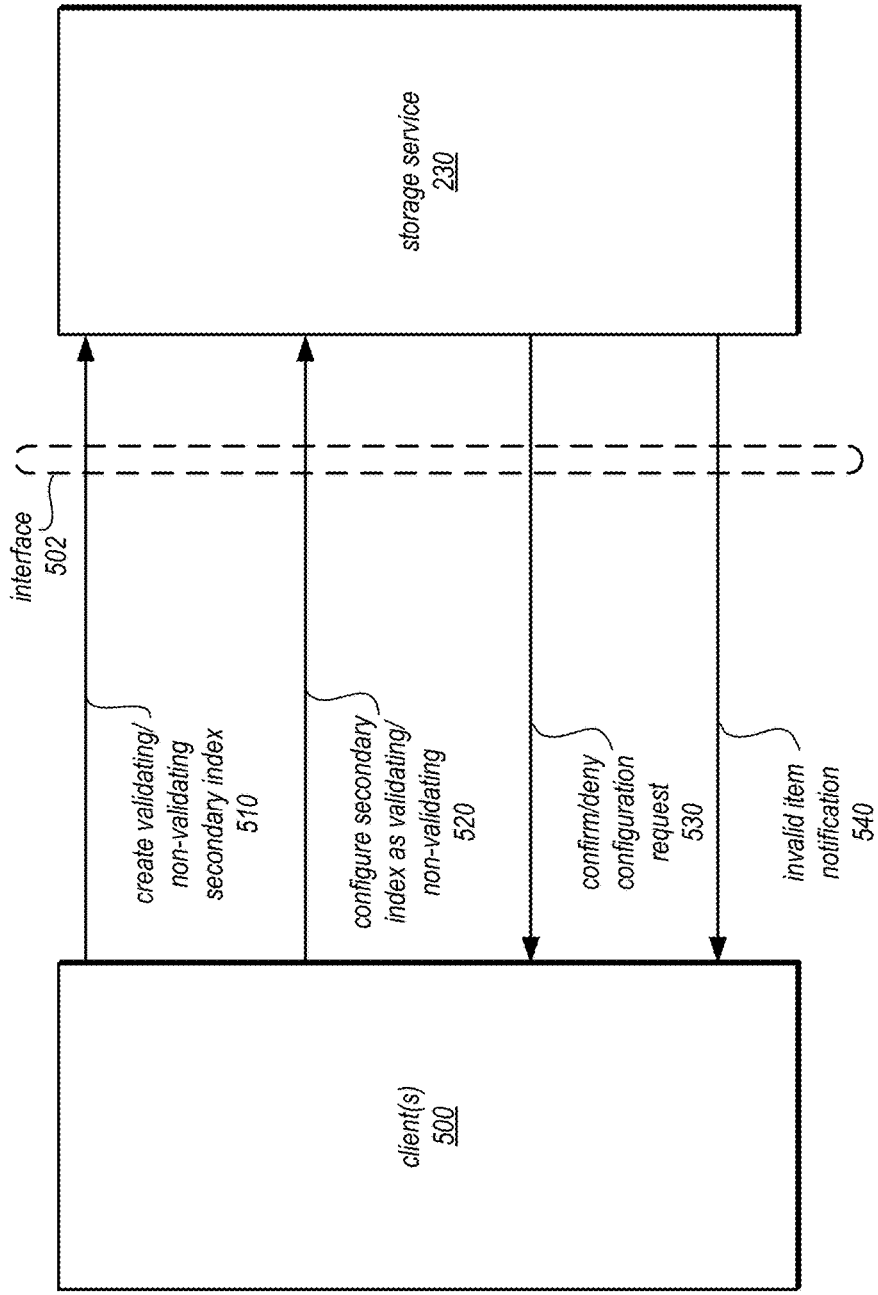
FIG. 5 is a diagram illustrating interactions between a client the storage service for creating and configuring secondary indexes for a table, according to some embodiments.

FIG. 5 is a diagram illustrating interactions between a client the storage service for creating and configuring secondary indexes for a table, according to some embodiments. Client(s) 500 may be clients that utilize storage service 230 (e.g., clients 210). Client(s) 500 may interact with a storage service 230 via an interface 502. Interface 502 may be programmatic interface, such as API, which may allow various requests to be submitted by client(s) 500 (such as those various requests and commands described above with regard to FIG. 3).

In at least some embodiments, client(s) 500 may submit a request to create a secondary index 510 that specifies whether the index is to be validating or non-validating. Other information, such as the indexing schema for the secondary index may also be included. In some embodiments, client(s) 500 may submit a request via interface 502 to configure an existing secondary index 520 as validating or non-validating. For instance, a secondary index identifier may be included in the request along with a flag or other indicator set to identify the desired validating or non-validating setting. In some instances, storage service 230 may consider whether the client request to configure as secondary index can be performed. For instance, a request to configure a secondary index as non-validating if another index shares the same attribute values for keys may be denied (a similar denial may be issued in response to a creation request 510). The confirmation or denial of the configuration change for a secondary index may be sent 530 via interface 520.

As noted above with regard to FIG. 4, in some embodiments, storage service 230 may provide notifications 540 of items that are invalid with respect to a non-validating secondary index. Such notifications 540 may indicate the item and/or operation (e.g., request to store, update, or index creation). In some embodiments, the notifications may provide access to an interface or tool to correct the item so that the item may be valid for inclusion in the non-validating secondary index.

Figure 6:
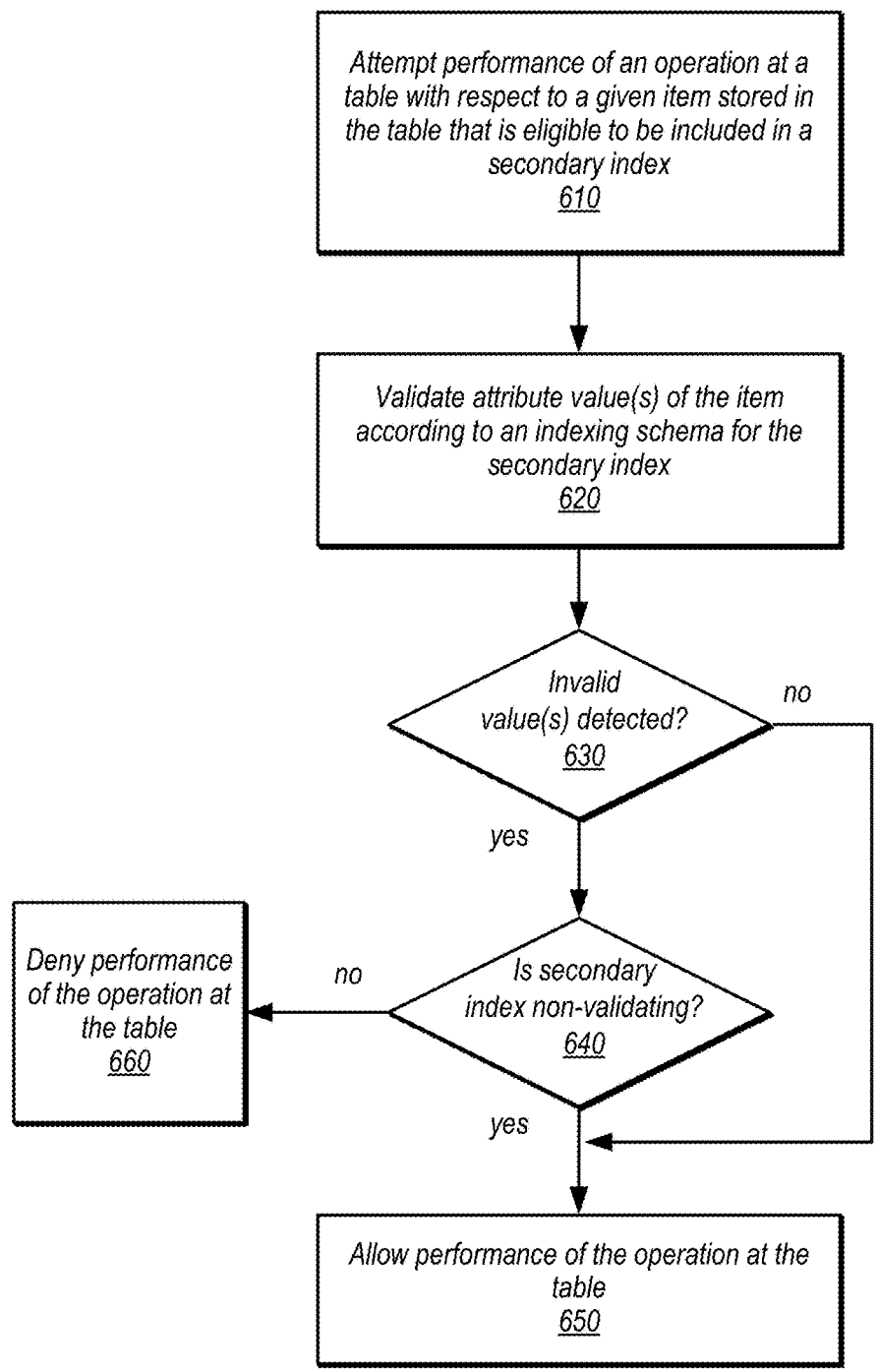
FIG. 6 is a high-level flowchart illustrating various methods and techniques to implement validating and non-validating secondary indexes for a table, according to some embodiments.

The examples of implementing a validating and non-validating secondary indexes for a table in a non-relational data store in FIGS. 2-5 have been given in regard to a non-relational storage service. However, various other types of non-relational data stores that may provide secondary indexes and thus may implement validating and non-validating secondary indexes for a table. FIG. 6 is a high-level flowchart illustrating various methods and techniques to implement validating and non-validating secondary indexes for a table, according to some embodiments. These techniques may be implemented using one or multiple storage nodes as described above with regard to FIGS. 2-5, as well as other databases and/or different implementations of a client and/or storage engine, and thus the following discussion is not intended to be limiting as to the other types or configurations of non-relational data stores that may implement the described techniques.

As indicated at 610, performance of an operation at a table with respect to a given item stored in the table may be attempted. For example, a request may be received to store a new item into a table at a non-relational data store. The request may indicate various attributes to be stored as part of the new item. A corresponding operation to store the new item in the table may be attempted in response to the request. In another example, a request to update an existing item in the table at the non-relational data store may be received. The request may indicate an attribute to add, remove, or change in the existing item. A corresponding operation to update the attribute in the manner specified by the request may be attempted. In some embodiments, an operation to create a secondary index for the table may be ongoing (e.g., in response to a request to create the secondary index). An attempt to index the given item may be performed as part of indexing all the items of a table to determine which items should be included in the secondary index. As noted above, in at least some embodiments, a secondary index may be generated for an existing table. Thus the secondary index creation operation may be performed while the table is online and available for servicing other access requests (e.g., reads, writes, or updates).

In various embodiments, the given item may be eligible for inclusion in a secondary index. For instance, the given item may include attributes which are identified by an indexing schema for the secondary index, as discussed above with regard to FIG. 1. Consider an example of an indexing schema that identifies attributes with names such as "gender" and/or "age" which are to be used to create a secondary index based on items that include such attributes. An eligible item includes attributes with the names of "gender" and/or "age." However, though the given item may be eligible for inclusion in the secondary index, validation of the given item may be performed according to the indexing schema for the secondary index, as indicated at 630, in order to evaluate whether the operation may be performed. Validating an item may be performed in different ways. For example, in some embodiments, an indexing schema for a secondary index may include validation parameters for the identified attribute values for including items in the secondary index. Validation parameters may be evaluated with respect to the values of the identified attributes of the given item. Consider a validation parameter that defines a data type of "string" for an identified attribute. The data type of the value of the identified attribute may be compared with the data type defined in the validation parameter for the attribute. If the data type does not match, then the identified attribute for the item is invalid. As multiple attributes may be used to index for a secondary index (e.g., an attribute as a hash value and another attribute as a range value that together act as a primary key for items in the secondary index), similar comparisons may be made for another validation parameters for multiple attributes. In some embodiments, validation parameters may define a data size limitation (e.g., a 1 Kb size limit) for attribute values. If the data size of the value of an identified attribute is greater than the size limitation (e.g., >1 Kb), then the attribute is invalid.

If invalid value(s) for the item are detected, then the item fails validation for the indexing schema for the non-secondary index. As indicated by the negative exit from 640, a determination may be made as to whether validation for the secondary index is enforced. As indicated at 650, for validating secondary indexes, the performance of the operation at the table may be denied, as indicated at 660. Consider the example requests to store a new item or update an item discussed above with regard to element 610. A denial, error message, or other indication may be sent in response to the request. In some embodiments, the error message may indicate that the request failed validation for the secondary index and/or may identify the particular validation error (e.g., identify the particular attribute and validation parameter). In some embodiments, if the operation is performed as part of creating the secondary index, the operation to create the secondary index may be aborted. If, however, the index is identified as a non-validating secondary index, then as indicated by the positive exit from 650, performance of the update may be allowed at the table, as indicated at 650. In the case of requests to store a new item in the table or update an attribute of an existing item, the data store may be updated to include the new item or change the attribute according to the request for the table. Note that allowing performance of the operation will create an inconsistency between the table and the non-validating index, as the table will store the new item or contain the updated attribute and the non-validating index will not. Similarly, in the scenario where the operation is performed as part of creating the secondary index, another item will be selected for indexing skipping the invalid item so that it is not included in the secondary index being created.

The techniques described above with regard to FIG. 6 may performed for multiple different validating and non-validating secondary indexes maintained for the same table. In at least some embodiments, when multiple secondary indexes are implemented for a table, attempting to perform an operation with respect to an item may include validating the item with respect to the different indexing schemas of each of the secondary indexes maintained for the table. In scenarios where the one or more of the same attributes are used as keys at different secondary indexes, the validation setting for one instance may affect the operations performed at the table with respect to data stored in the table that may be eligible to be included at another secondary index. For instance, if a non-validating secondary index and a validating secondary index use the same attribute, then no operations at the table with respect to invalid items may be performed, even though the non-validating secondary index does not have to be kept consistent with the table. In such a scenario, the validating secondary index may effectively block invalid items from being included in the table even though such items could be included in the table if only eligible for inclusion in a non-validating secondary index.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
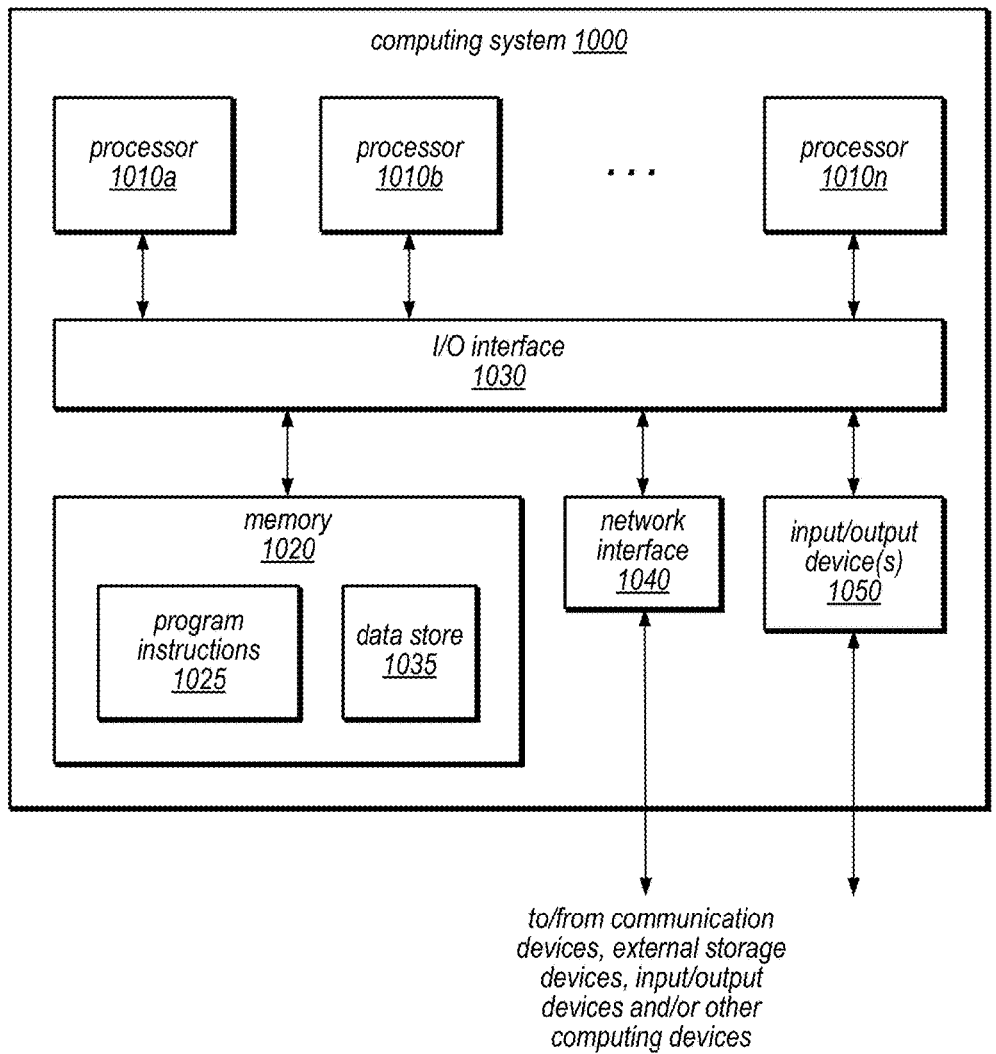
FIG. 7 is a block diagram illustrating an example computing system, according to some embodiments.

Embodiments of implementing validating and non-validating secondary indexes for a table in a non-relational database as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020)

into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage nodes maintaining a table in a non-relational data store;
   one or more other storage nodes maintaining a secondary index for the table in the non-relational data store according to an indexing schema; and
   one or more processors and memory to implement a storage engine for the table, configured to:
   receive an operation for a given item in the table, wherein the given item is eligible to be included in the secondary index;
   validate one or more key values of the given item according to respective key validation parameters in the indexing schema;
   detect an invalid value for at least one of the key values according to the validation;

identify the secondary index as a non-validating secondary index; and
perform the operation with respect to the given item even though the invalid value was detected for at least one of the key values of the given item.

2. The system of claim 1, wherein the respective key validation parameters specify a respective data type for the key value, and wherein to detect the invalid value for the at least one key value, the storage engine is configured to determine that a given data type for the at least one key value does not match the respective data type in the key validation parameter for the at least one key value.

3. The system of claim 1, wherein the operation is a secondary index creation operation to create the secondary index that indexes a plurality of different items in the table including the given item.

4. The system of claim 1, wherein the non-relational data store is a network-based storage service, wherein the system further implements a network-based interface for the network-based storage service, and wherein a request to configure the secondary index as non-validating is received via the network-based interface for network-based storage service prior to the attempt to perform the operation.

5. A method, comprising:
performing, by one or more computing devices:
evaluating a given item for performance of an operation at a table with respect to the given item stored in the table, wherein the given item is eligible to be included in a secondary index for the table, wherein the table and the secondary index are maintained in a non-relational data store, and wherein the evaluating comprises:
validating one or more attribute values of the given item according to an indexing schema for the secondary index;
detecting an invalid value for at least one of the attribute values according to the validation;
identifying that the secondary index is a non-validating index; and
performing the operation with respect to the given item even though the invalid value was detected for at least one of the attribute values of the given item.

6. The method of claim 5, further comprising:
wherein the operation is an operation to store the given item in the table;
wherein the evaluating is performed in response to receiving a request to store the given item in the table, wherein one or more other item attributes of the item that are key values according to an indexing schema for the table are validated without error.

7. The method of claim 5, wherein the indexing schema includes one or more validation parameters that specify a respective data type for the one or more attribute values, and wherein detecting the invalid value for the at least one attribute value comprises determining that a given data type for the at least one attribute value does not match the respective data type in the validation parameter for the at least one attribute value.

8. The method of claim 5, further comprising:
prior to evaluating the given item, receiving a request to configure the secondary index as non-validating.

9. The method of claim 5, further comprising:
receiving a request to reconfigure the secondary index as validating such that a subsequent evaluation for performance of an operation at the table with respect to another item denies performance of the operation with respect to the other item in response to detecting an invalid value for one or more attributes of the other item according to the indexing schema.

10. The method of claim 5, wherein one or more other validating secondary indexes are maintained for the table.

11. The method of claim 10, wherein ignoring the detection of the invalid value is further performed in response to determining that the one or more attribute values are valid with respect to an indexing schema for the one or more other validating secondary indexes in addition to determining that the secondary index is a non-validating index.

12. The method of claim 5, wherein the operation is a secondary index creation operation to create the secondary index that indexes a plurality of different items in the table including the given item.

13. The method of claim 5, wherein the non-relational data store is a distributed data store and wherein the secondary index is stored at one or more storage nodes that are different than one or more other storage nodes that store the table.

14. A non-transitory, computer-readable storage medium, storing program instructions that when executed by one or more computing devices cause the one or more computing devices to implement:
receive an operation at a table with respect to a given item stored in the table, wherein the given item is eligible to be included in a secondary index for the table, wherein the secondary index and the table are maintained in a non-relational data store;
validating one or more attribute values of the given item according to an indexing schema for the secondary index;
detecting an invalid value for at least one of the attribute values according to the validation;
identifying that the secondary index is a non-validating index; and
performing the operation with respect to the given item even though the invalid value was detected for at least one of the attribute values of the given item.

15. The non-transitory, computer-readable storage medium of claim 14, wherein the program instructions cause the one or more computing devices to further implement:
prior to attempting to perform the operation, receiving a request to update the one or more attribute values of the given item at the table, wherein the operation is an operation to update the one or more attribute values of the given item.

16. The non-transitory, computer-readable storage medium of claim 14, wherein the indexing schema includes a validation parameter that specifies a data size limitation for the one or more attribute values, and wherein, in detecting the invalid value for the at least one attribute, the program instructions cause the one or more computing devices to implement determining that a data size of the one or more attribute values exceeds the data size limitation specified in the validation parameter.

17. The non-transitory, computer-readable storage medium of claim 14, wherein the program instructions cause the one or more computing devices to further implement:
prior to attempting to perform the operation, receiving a request to configure the secondary index as non-validating.

18. The non-transitory, computer-readable storage medium of claim 14, wherein the program instructions cause the one or more computing devices to further implement:
receiving a request to reconfigure the secondary index as validating such that a subsequent attempt to perform an operation with respect to another item denies performance of the operation with respect to the other item in response to detecting an invalid value for one or more attributes of the other item according to the indexing schema.

19. The non-transitory, computer-readable storage medium of claim 14, wherein one or more other non-validating secondary indexes are maintained for the table.

20. The non-transitory, computer-readable storage medium of claim 14, wherein the non-relational data store is a network-based storage service and wherein the secondary index is stored at one or more storage nodes that are different than one or more other storage nodes that store the table.

* * * * *